Sept. 4, 1928.
C. F. KOKEMILLER
TANK GAUGE
Filed Sept. 10, 1923
1,683,557
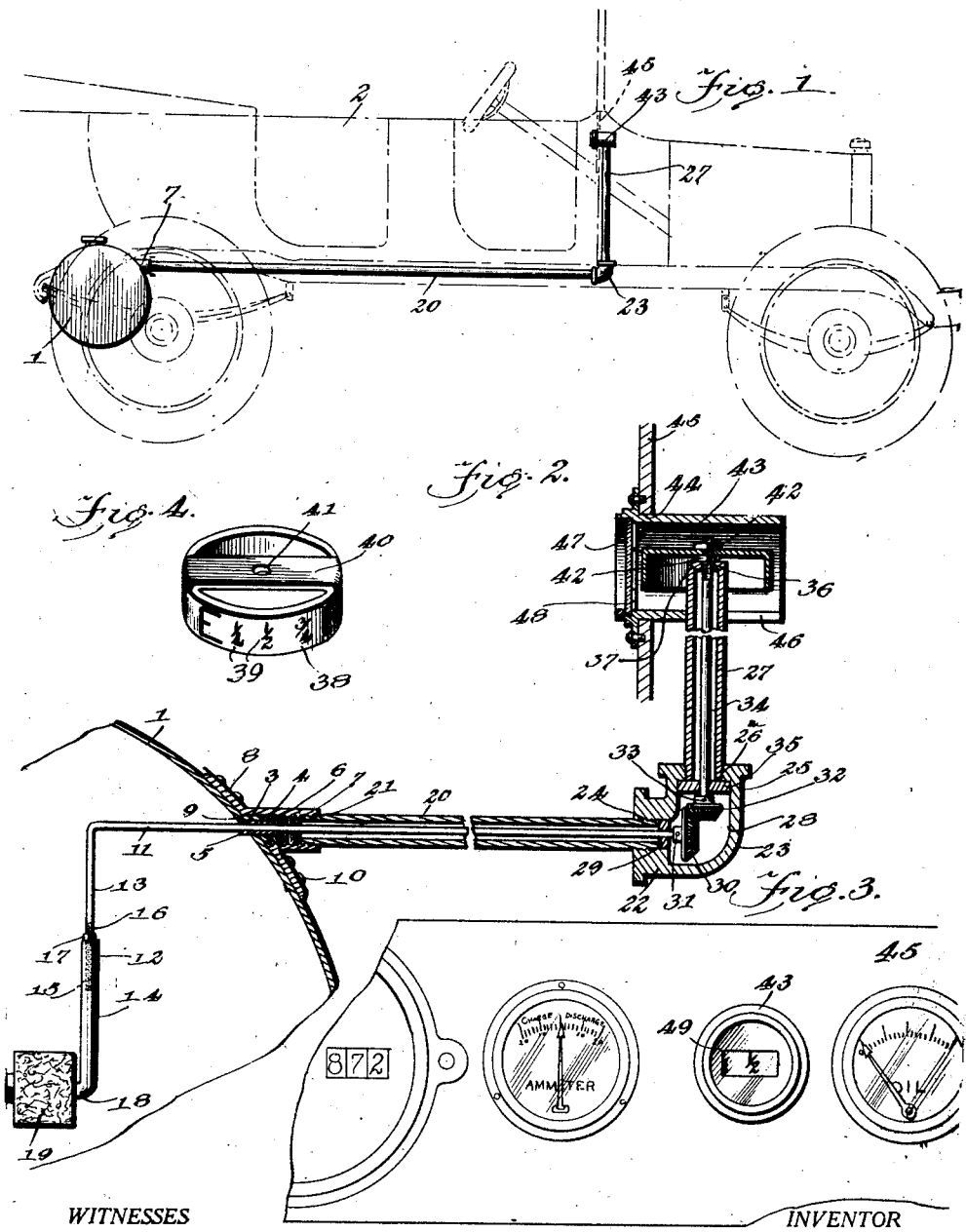

Patented Sept. 4, 1928.

1,683,557

UNITED STATES PATENT OFFICE.

CARL FRED. KOKEMILLER, OF STORY CITY, IOWA.

TANK GAUGE.

Application filed September 10, 1923. Serial No. 661,946.

My invention relates to improvements in tank gauges, and it consists in the combinations, constructions and arrangements herein described and claimed.

An object of the invention is to provide a simple and relatively inexpensive device of the character described which is adapted to be applied to liquid containing tanks of various sizes and shapes and which affords facilities for accurately indicating at a distance from a tank to which it is attached the quantity of liquid in the tank at any given time.

Other objects and advantages will be apparent from the following description, considered in conjunction with the accompanying drawings, in which Figure 1 is a view showing the device operatively applied to an automobile in position to indicate to the operator of the automobile the liquid content of the fuel tank of the automobile, Figure 2 is a relatively enlarged fragmentary sectional view, showing the manner in which the device is supported, Figure 3 is a fragmentary face view of the instrument board of the automobile showing the portion of the device which is supported by the instrument board, and Figure 4 is a perspective view showing an indicator ring which is included in the device.

Referring now to the drawing and particularly to Figure 1, the numeral 1 designates a tank of generally conventional construction with which an automobile 2 may be equipped. The tank 1 is provided with a lateral opening 3 in its upper part from which a short nipple 4 may extend outwardly from the tank. A bushing 5 which fits in the opening 3 and the bore of the nipple 4 is held in place by a retaining ring 6 which is carried by the bushing at its outer end and is provided with external screw threads engaged with the threads of the bore of a tubular extension 7 which is integral with an attaching plate 8 and extends outwardly from an opening 9 in the latter. The opening 9 is adapted to receive the nipple 4 and the attaching plate 8 may be secured to the tank 1 through the agency of rivets 10 or like fastening elements. A shaft 11 extends through the bore of the bushing 4 and the opening 3 into the tank 1 and is freely rotatable. A rocker arm 12 extends within the tank 1 substantially at right angles to the shaft 11 at the inner end of the latter and comprises a section 13 which is by preference integral with the shaft 11 at the inner end of the latter and a section 14 having a threaded bore 15 engaged with threads 16 on the outer end portion of the section 13, whereby the rocker arm 12 is adjustable in length. A nut 17 on the threaded end portion 16 of the section 13 may be adjusted to hold the sections 13 and 14 in adjusted connected together relation.

The section 14 of the rocker arm has a laterally turned end portion 18 which carries a float 19. The shaft 11 extends exteriorly of the tank 1 within a tubular housing 20 which has a threaded end portion 21 engaged with the threaded bore of the tubular extension 7. The tubular housing 20 is threaded externally at its end remote from the tank for engagement with the threaded bore of the horizontal branch 22 of an elbow member 23, as indicated at 24 in Figure 2. The elbow member 23 also includes a vertical branch 25 having a threaded bore 26 engaged with the threaded lower end portion of a vertically disposed tubular housing 27. The bores of the horizontal and vertical branches of the elbow member are enlarged at their juncture to provide a chamber 28. The shaft 11 extends through a central opening in a bushing 29 which is disposed in the horizontal branch 22 into the chamber 28. A bevel gear 30 is carried by the shaft 11 at the end of the latter which is received within the chamber 28, being secured to the shaft by a pin 31 through the hub portion thereof. The beveled gear 30 is in mesh with a bevel gear 32 which has a hub portion secured by a pin 33 to a vertical shaft 34 which extends through the tubular housing 27 and is journaled adjacent to its lower end in a bushing 35 which is disposed within the chamber 28 at the end of the latter which is proximate to the bore of the vertical branch 25. The vertical shaft 34 extends loosely through an opening 36 in a head 37 at the upper end of the tubular housing 27 and is threaded adjacent to its upper end. An indicator ring 38 having spaced apart indicia on its periphery as indicated at 39 is formed with a diametrically disposed cross piece 40 at its upper end. The cross piece 40 has an opening 41 located intermediate its ends through which the upper end portion of the vertical shaft 34 extends. The indicator ring 38 is secured to the vertical shaft 34 to rotate with the latter through the agency of a pair of clamping nuts 42. Respective clamping nuts 42 are in threaded engagement with the upper end portion of the shaft 34 and one of these nuts is disposed below the cross piece 40 while the other nut 42 is disposed on the threaded end portion of the shaft 34 above the cross piece 40 to clamp the latter against the first nut 42.

The tubular housing 20 may be of such length and disposed in such relation to the body of the automobile 2 that the upper end portion of the tubular housing 27 will be received within a cylindrical casing 43 which is supported adjacent to one of its ends in an opening 44 in the instrument board 45 of the automobile. The indicator ring 38 will be disposed within the casing 43 which may be provided with a slot 46 through which the upper end portion of the housing 27 may extend. The slot 46 extends from one end of the casing 43 for part of the length of said casing so that the casing 43 can be removed from the opening 44 of the instrument board if desired without there being any necessity of removing the tubular housing or any of the remaining parts of the device from the positions shown in Figure 2. The casing 43 has a transparent closure 47 received within the inner end thereof. An opaque backing plate or closure 48 which is located within the casing 43 between the indicator ring 38 and transparent closure 47 has an opening 49 through which the indicia on the indicator ring 38 may be seen.

From the foregoing description of the various parts of the device, the operation thereof will be readily understood. The shaft 11 constitutes a drive shaft which will be rocked as the float 19 is moved within the tank 1 in accordance with the rise and fall of a liquid within the tank. The shaft 11 will operate the vertical or driven shaft 34 and the indicator ring 38 will be rotated with the shaft 34 to present the indicia on the ring 38 successively to view through the opening 49. The indicia 39 indicate various quantities or depths of liquid within the tank, as for instance the indicia may comprise the letters F, indicating full, the fractions ¾, ½, ¼ and the letter E, indicating conditions when the tank is filled to ¾ of its capacity, ½ of its capacity, ¼ of its capacity and when the tank is completely empty. The rocker arm 12 may be adjusted in length for use in tanks of different sizes and the float and the indicator ring 38 are adjusted initially so that the letter F will be presented to view through the opening 49 when the tank has been filled with liquid and the letter E presented to view through the opening when the tank is empty. The gear 30 is considerably larger than the gear 32, the ratio preferably being 2 to 1.

While the device is designed primarily for use on an automobile, it will be obvious that it may be applied to tanks other than those with which automobiles are equipped without departing from the spirit and scope of the invention.

Obviously, my invention is susceptible of embodiment in forms other than that illustrated in the accompanying drawings and I therefore consider as my own all modifications and adaptations of the form of the device herein described which fairly fall within the scope of the appended claims.

Having thus described the invention, what is claimed is:—

1. In a liquid gauge, a tubular housing to be supported vertically adjacent the instrument board of an automobile, a shaft journalled in the tubular housing with one end projecting above the same, a rotatable indicating element carried by the projecting end of the shaft, and a housing insertable through an opening in the instrument board to house the indicating element and having one end open and having its wall provided with a longitudinal slot embracing the tubular housing, a sight glass arranged within the other end of the housing.

2. In combination a support having an opening therein, a tubular housing supported vertically to one side of the support with one end in transverse alignment with the opening, a liquid level responsive indicating element rotatably supported in a horizontal plane on the tubular housing, a horizontally disposed casing open at one end and insertable longitudinally through the opening and receiving the rotatable indicating element, and provided with a longitudinal slot receiving the upper end of the tubular housing and permitting longitudinal movement of the casing to and from the opening.

CARL FRED. KOKEMILLER.